United States Patent
Dostie, Jr.

(10) Patent No.: US 12,526,616 B2
(45) Date of Patent: Jan. 13, 2026

(54) TRIGGERING OF DEVICE INVENTORY DISCOVERY

(71) Applicant: Boost SubscriberCo L.L.C., Englewood, CO (US)

(72) Inventor: Thomas Edward Dostie, Jr., Highlands Ranch, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 371 days.

(21) Appl. No.: 18/096,482

(22) Filed: Jan. 12, 2023

(65) Prior Publication Data

US 2023/0336964 A1 Oct. 19, 2023

Related U.S. Application Data

(60) Provisional application No. 63/331,198, filed on Apr. 14, 2022.

(51) Int. Cl.
*H04W 8/00* (2009.01)
*H04W 8/24* (2009.01)

(52) U.S. Cl.
CPC ............. *H04W 8/005* (2013.01); *H04W 8/24* (2013.01)

(58) Field of Classification Search
CPC ................................ H04W 8/005; H04W 8/24
See application file for complete search history.

(56) References Cited

U.S. PATENT DOCUMENTS

| | | | | |
|---|---|---|---|---|
| 2016/0269261 A1* | 9/2016 | Webb | ................... | H04L 41/0869 |
| 2018/0324050 A1* | 11/2018 | Smith | ..................... | H04L 41/12 |
| 2019/0238506 A1* | 8/2019 | Shaw | .................... | H04L 63/102 |
| 2019/0296979 A1* | 9/2019 | Gupta | ..................... | G06N 3/08 |

* cited by examiner

*Primary Examiner* — Won Tae C Kim
(74) *Attorney, Agent, or Firm* — Kipman Tyler Werking; Frontier IP Law PLLC

(57) ABSTRACT

Example embodiments are directed towards systems and methods for triggering of device inventory discovery. The system may electronically listen to one or more event streaming data sources for identification information about new devices on the network. In response to receiving identification information about a new device on the network resulting from the listening, the system triggers a separate network discovery tool to electronically interrogate the new device over the network using the identification information to obtain additional information about the new device. Based on the triggering of the network discovery tool, the system receives the additional information from the network discovery tool about the new device on the network. Then, based on the additional information received from the network discovery tool about the new device on the network, the system may electronically reference an inventory of devices on the network or existing information regarding devices expected to be on the network to take further action.

12 Claims, 5 Drawing Sheets

TRIGGERING OF DEVICE INVENTORY DISCOVERY

TECHNICAL FIELD

The present disclosure relates generally to networks, more particularly, to triggering of device inventory discovery in telecommunication networks.

BRIEF SUMMARY

As a wireless telecommunication service provider builds and maintains their network (such as a cloud-native 5G wireless network) it is important to detect and receive information about new devices appearing on the network for security reasons and because there may be issues, potential issues or errors made during the actual implementation of the network when network components are installed and activated that may cause delay in network deployment, operation and maintenance. Thus, the earlier such issues, potential issues and errors can be identified and addressed, the more time and costs can be saved when deploying and maintaining the network. It is with respect to these and other considerations that the embodiments described herein have been made.

Briefly described, embodiments disclosed herein are directed to triggering of device inventory discovery. For example, a method for triggering device inventory discovery in a network may include electronically listening to one or more event streaming data sources for identification information about new devices on the network. In response to receiving identification information about a new device on the network resulting from the listening, the system triggers a separate network discovery tool to electronically interrogate the new device over the network using the identification information to obtain additional information about the new device. Based on the triggering of the network discovery tool, the system receives the additional information from the network discovery tool about the new device on the network. Based on the additional information received from the network discovery tool about the new device on the network, the system may then electronically reference an inventory of devices on the network or existing information regarding devices expected to be on the network to take further action.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
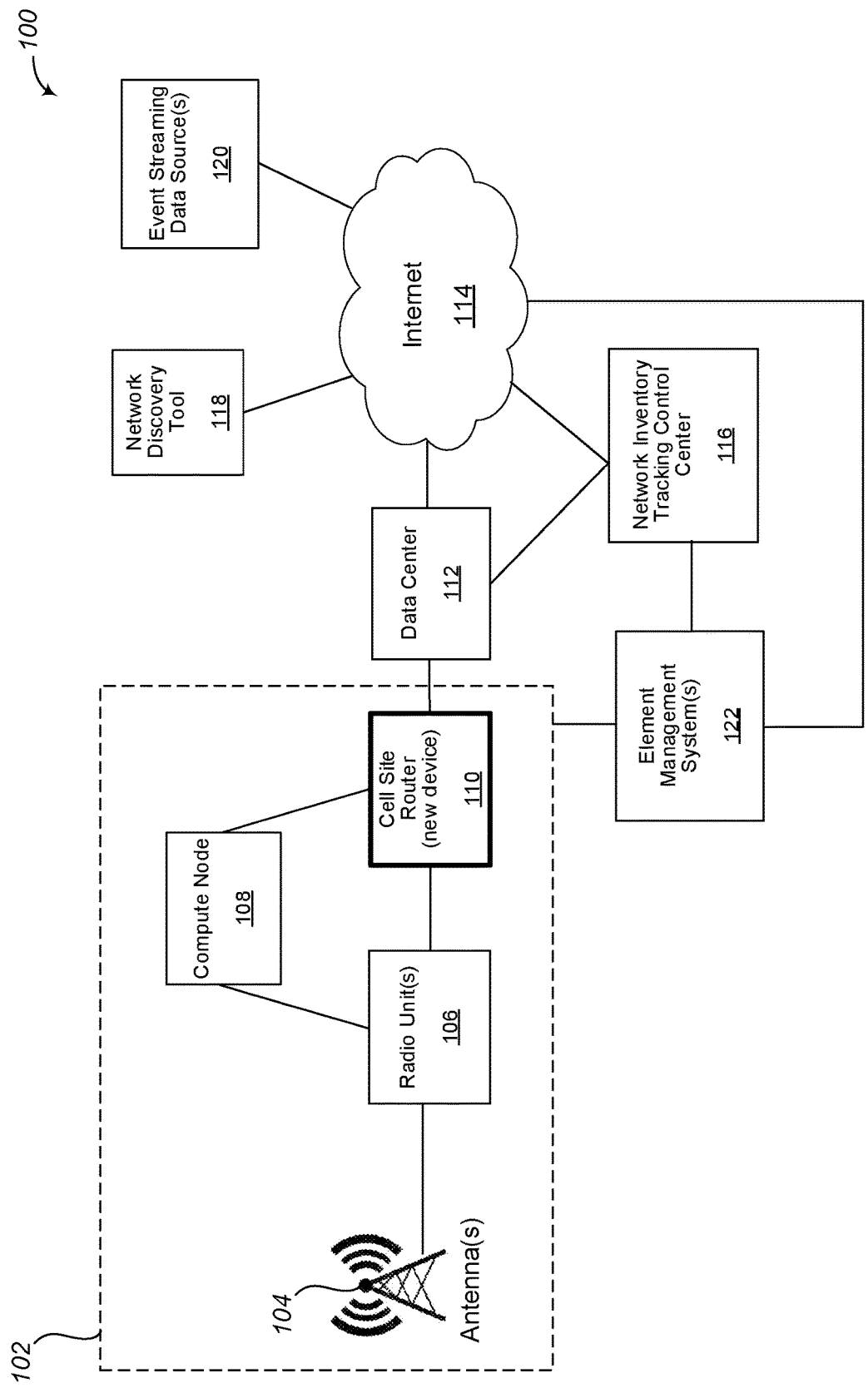
FIG. 1 illustrates a diagram of an example portion of a wireless telecommunication network in which triggering of device inventory discovery may be implemented in accordance with embodiments described herein.

FIG. 1 illustrates a diagram of an example portion of a wireless telecommunication network 100 in which triggering of device inventory discovery may be implemented in accordance with embodiments described herein.

As shown, the example portion of the wireless telecommunication network 100 may, for example, comprise or be a portion of a cloud-native 5G wireless network. However, the techniques and functionality described herein may be applied to other types of networks in various embodiments. 5G provides a broad range of wireless services delivered to the end user across multiple access platforms and multi-layer networks. 5G is a dynamic, coherent and flexible framework of multiple advanced technologies supporting a variety of applications. 5G utilizes an intelligent architecture, with Radio Access Networks (RANs) not constrained by base station proximity or complex infrastructure. 5G enables a disaggregated, flexible and virtualized RAN with interfaces creating additional data access points.

5G network functions may be completely software-based and designed as cloud-native, meaning that they're agnostic to the underlying cloud infrastructure, allowing higher deployment, agility and flexibility. With the advent of 5G, industry experts defined how the 5G core (5GC) network should evolve to support the needs of 5G New Radio (NR) and the advanced use cases enabled by it. The 3rd Generation Partnership Project (3GPP) develops protocols and standards for telecommunication technologies including RAN, core transport networks and service capabilities. 3GPP has provided complete system specifications for 5G network architecture which is much more service oriented than previous generations.

Multi-Access Edge Computing (MEC) is an important element of 5G architecture. MEC is an evolution in cloud computing that brings the applications from centralized data centers to the network edge, and therefore closer to the end users and their devices. This essentially creates a shortcut in content delivery between the user and host, and the long network path that once separated them.

This MEC technology is not exclusive to 5G but is certainly important to its efficiency. Characteristics of the MEC include the low latency, high bandwidth and real time access to RAN information that distinguishes 5G architecture from its predecessors. This convergence of the RAN and core networks enables operators to leverage new approaches to network testing and validation. 5G networks based on the 3GPP 5G specifications provide an environment for MEC deployment. The 5G specifications define the enablers for edge computing, allowing MEC and 5G to collaboratively route traffic. In addition to the latency and bandwidth benefits of the MEC architecture, the distribution of computing power is better enables the high volume of connected devices inherent to 5G deployment and the rise of IoT.

The 3rd Generation Partnership Project (3GPP) develops protocols for mobile telecommunications and has developed a standard for 5G. The 5G architecture is based on what is called a Service-Based Architecture (SBA), which implements IT network principles and a cloud-native design approach. In this architecture, each network function (NF) offers one or more services to other NFs via Application Programming Interfaces (API). Network function virtualization (NFV) decouples software from hardware by replacing various network functions such as firewalls, load balancers and routers with virtualized instances running as software. This eliminates the need to invest in many expensive hardware elements and can also accelerate installation times, thereby providing revenue generating services to the customer faster.

NFV enables the 5G infrastructure by virtualizing appliances within the 5G network. This includes the network slicing technology that enables multiple virtual networks to run simultaneously. NFV may address other 5G challenges through virtualized computing, storage, and network resources that are customized based on the applications and customer segments. The concept of NFV extends to the RAN through, for example, network disaggregation promoted by alliances such as O-RAN. This enables flexibility, provides open interfaces and open source development, ultimately to ease the deployment of new features and technology with scale. The O-RAN ALLIANCE objective is to allow multi-vendor deployment with off-the shelf hardware for the purposes of easier and faster inter-operability. Network disaggregation also allows components of the network to be virtualized, providing a means to scale and improve user experience as capacity grows. The benefits of virtualizing components of the RAN provide a means to be more cost effective from a hardware and software viewpoint especially for IoT applications where the number of devices is in the millions.

The 5G New Radio (5G NR) RAN comprises of a set of radio base stations (each known as Next Generation Node B (gNb)) connected to the 5G core (5GC) and to each other. The gNb incorporates three main functional modules: the Centralized Unit (CU), the Distributed Unit (DU), and the Radio Unit (RU), which can be deployed in multiple combinations. The primary interface is referred to as the F1 interface between DU and CU and are interoperable across vendors. The CU may be further disaggregated into the CU user plane (CU-UP) and CU control plane (CU-CP), both of which connect to the DU over F1-U and F1-C interfaces respectively. This 5G RAN architecture is described in 3GPP TS 38.401 V16.8.0 (2021-12). Each network function (NF) is formed by a combination of small pieces of software code called as microservices.

The example portion of the wireless telecommunication network 100 shown in FIG. 1, which may comprise or be a portion of a cloud-native 5G wireless network as described above, includes an example cellular (cell) site 102. The cell site 102 may include one or more antennas 104; one or more RUs 106 operably connected to the antenna(s) 104; a cellular site (cell site) router 108 operably connected to the RU(s) 10; and a compute node 108 operably connected to the RU(s) 106 and the cell site router 110. The compute node 108 may run applicable network functions (NFs) associated with the example portion of the wireless telecommunication network 100. Various other network components, equipment or connections may be present in various different embodiments. In the present example, the cell site router 110 is a new device appearing on the network of the telecommunication service provider (e.g., of a mobile network operator (MNO)). This may occur, for example, when the cell site 102 is being built, changed or updated.

The cell site 102 is operably connected to the rest of the wireless telecommunication network via an uplink to a data center 112 (which may be physical, virtual or cloud-based). The data center 112 may include or be connected to a network inventory tracking control center 116 operated by the wireless telecommunication service provider, such as an MNO. The network inventory tracking control center 116 may be directly connected to the data center 112 and/or be connected to the data center 112 via the Internet 114. In an example embodiment, the network inventory tracking control center 116 implements the model-based inventory system and operations as described herein for the wireless telecommunication network, including the portion of the wireless telecommunication network 100 shown in FIG. 1.

In an example embodiment, before, during or after the process of the portion of the wireless telecommunication network 100 being implemented (being built and becoming operational), the network inventory tracking control center 116 may electronically listen to one or more event streaming data sources 120 for identification information about new devices on the network. As shown in FIG. 1, one or more event streaming data sources 120 may be connected to other devices in the network via the Internet. However, such event streaming data sources 120 may also or instead be connected to such devices via a local network. An example of an even streaming data source is that which is provided by the Apache Kafka® event streaming platform. Such event streaming platforms may combine capabilities and functionality to publish (write) and subscribe to (read) streams of events, including continuous import/export of data from other systems; store streams of events durably and reliably;

and process streams of events as they occur or retrospectively. In the present example, embodiment, the network inventory tracking control center 116 subscribes to streams of events provided by the event streaming data sources 120, which may publish events occurring on the telecommunication network, including cell site 102. This may include events indicating identification information of new devices appearing on the network, such as for the new cell site router 110.

In response to receiving identification information about a new device on the network resulting from the listening, the network inventory tracking control center 116 triggers a separate network discovery tool 118 to electronically interrogate the new device (e.g., new cell site router 110) over the network using the identification information to obtain additional information about the new device. Examples of separate network discovery tools are Unified Analytics and Assurance Resource Adapters (RAs) which are provided by The Blue Planet® (a division of Ciena). Such RAs are smart software plugins that provide device support that includes discovery of physical, virtual, and service inventory, as well as support for key protocols including Simple Network Management Protocol (SNMP), TL-1, Common Object Request Broker Architecture (CORBA), and streaming telemetry, among others. However, unless an entire network or subnet is scanned, such separate network discovery tools may require at least an IP address and host name to be able to initially communicate with and interrogate an individual device. Thus, the network inventory tracking control center 118 first listening to one or more event streaming data sources 120 for identification information about new devices on the network provides the required information, such IP address and host name (and perhaps also type of device), with which to trigger (or seed) the separate network discovery tool 118 to contact the individual device, without having to scan the entire network or subnet to find new devices to interrogate.

Based on the triggering of the network discovery tool 118, the network inventory tracking control center 116 receives the additional information from the network discovery tool 118 (which may be via one or more element management system(s) (EMSs) 122) about the new cell site router 110 on the network. Based on the additional information received from the network discovery tool 118 about the new cell site router 110 on the network, the network inventory tracking control center 116 may electronically reference an inventory of devices on the network or existing information regarding devices expected to be on the network to take further action. Such an inventory of devices on the network or existing information regarding devices expected to be on the network may be stored at, accessible by, generated and/or managed by the network inventory tracking control center 116.

In an example embodiment, the identification information may include a type of the new device (e.g., a vendor or manufacturer of the new cell site router 110). The network inventory tracking control center 116 may then select the separate network discovery tool 118 from a plurality of separate network discovery tools based on the type of the new device. In particular, different network discovery tools may be specialized for communicating with particular types of devices from particular vendors or manufacturers that use different communication protocols.

Other network components, configurations, and connections between such components of a cell site than shown in FIG. 1 may be present in various different embodiments.

Figure 2:
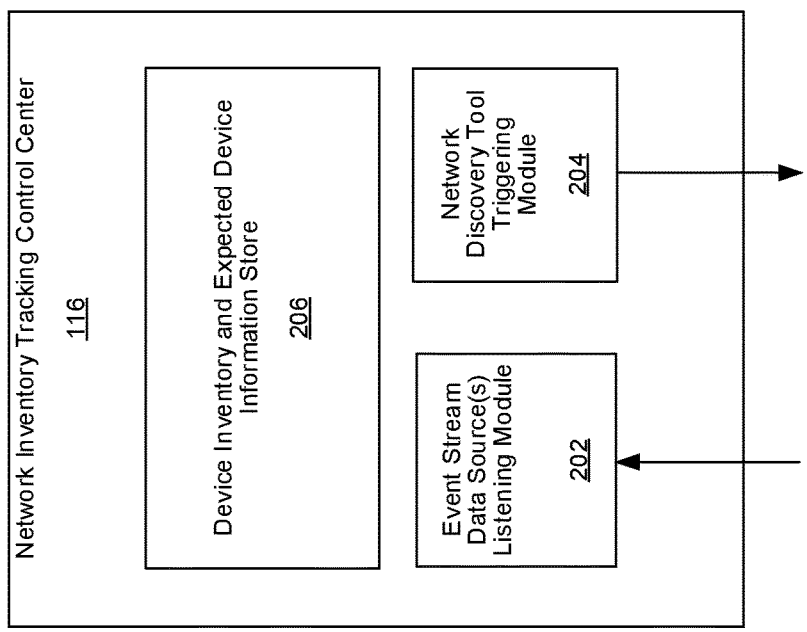
FIG. 2 is a diagram of an example network inventory tracking control center in accordance with an embodiment described herein.

FIG. 2 is a diagram of an example network inventory tracking control center 116 in accordance with an embodiment described herein.

In the present example shown in FIG. 2, the network inventory tracking control center 116 includes an event stream data source(s) listening module 202, a network discovery tool triggering module 204 and a device inventory and expected device Information store 206. The event stream data source(s) listening module 202 electronically listens to one or more of the event streaming data sources 120 of FIG. 1 for identification information about new devices on the network. In response to receiving identification information about a new device on the network (such as new cell site router 110 of FIG. 1) resulting from the listening, the tool triggering module 204 triggers the separate network discovery tool 118 of FIG. 1 to electronically interrogate the new device over the network using the identification information to obtain additional information about the new device.

Based on the triggering of the network discovery tool 118 in FIG. 1 by the network discovery tool triggering module 204, the network inventory tracking control center 116 receives the additional information from the network discovery tool 118 (which may be via one or more EMSs 122 of FIG. 1) about the new cell site router 110 on the network. Then, based on the additional information received from the network discovery tool 118 about the new cell site router 110 on the network, the network inventory tracking control center 116 may electronically reference the device inventory and expected device Information store 206 to take further actions, such as to update the device inventory or reconcile discrepancies between the received information regarding the new device and the information regarding devices expected to be on the network.

Figure 3:
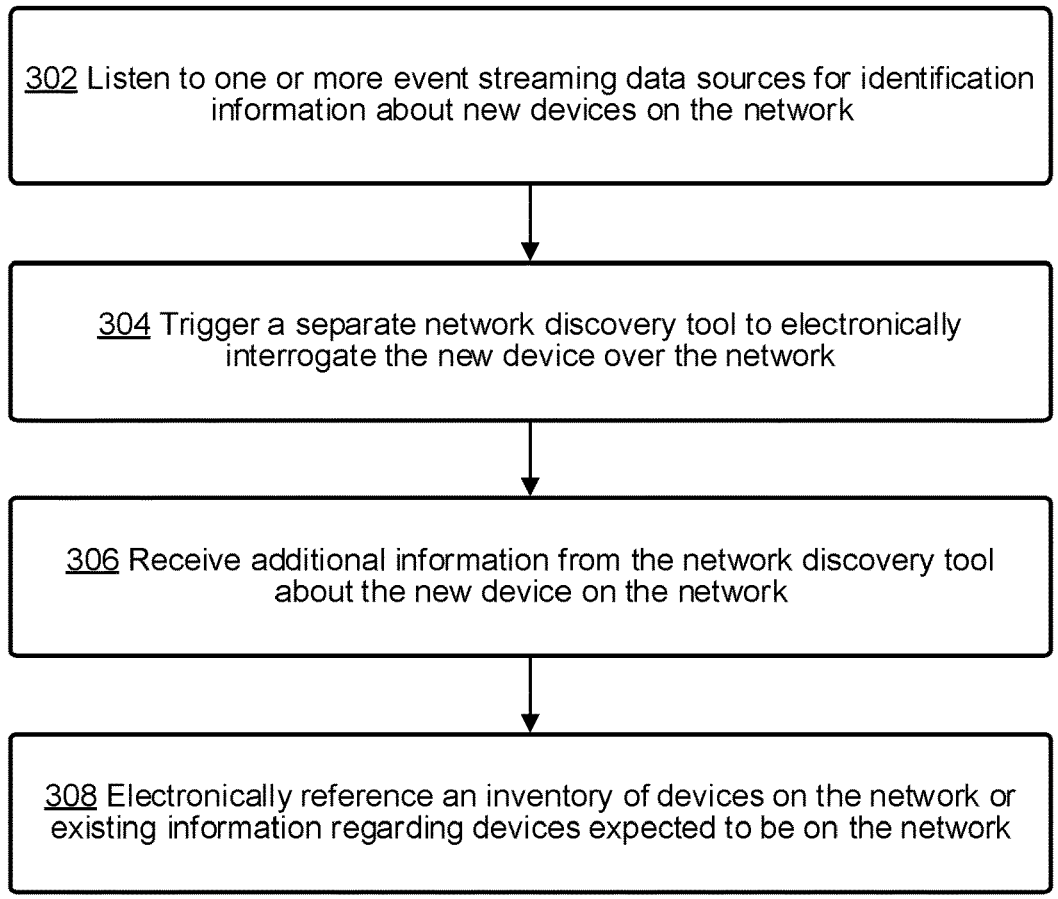
FIG. 3 illustrates a logical flow diagram showing an example embodiment of a process for triggering of device inventory discovery in accordance with embodiments described herein.

FIG. 3 illustrates a logical flow diagram showing an example embodiment of a process 300 for triggering of device inventory discovery when the type of device is received in accordance with embodiments described herein.

At 302, the network inventory tracking control center 116 electronically listens to one or more event streaming data sources for identification information about new devices on the network. In some instances, the identification information includes at least an Internet Protocol (IP address) and a host name, but may also include other information, such a type of device (manufacturer, vendor and/or model number). In other instances, the identification information includes only the minimum amount of information to enable a separate network discovery tool to electronically interrogate the new device over the network, such as an IP address and a host name.

At 304, the network inventory tracking control center 116, in response to receiving identification information about a new device on the network resulting from the listening, triggers the separate network discovery tool to electronically interrogate the new device over the network using the identification information to obtain additional information about the new device. In an example embodiment, the identification information includes a type of the new device. The triggering the separate network discovery tool to electronically interrogate the new device may then include: selecting the separate network discovery tool from a plurality of separate network discovery tools based on the type of the new device; and electronically providing instructions and applicable event management system (EMS) login credentials to the network discovery tool for the network discovery tool to call an EMS specifically associated with the type of the new device to obtain the additional information about the new device.

In another scenario, the identification information does not include a type of the new device. The triggering the separate network discovery tool to electronically interrogate the new device may then include selecting the separate network discovery tool from a plurality of separate network discovery tools for devices of different types based on the separate network discovery tool being for a most common type of device known by a network inventory tracking control center to be on the network. Also, in response to the selected separate network discovery tool not being able to interrogate the new device, the network inventory tracking control center 116 may select different separate network discovery tools from the plurality of separate network discovery tools for different types of devices than the selected separate network discovery tool until a separate network discovery tool is found that is able to interrogate the new device.

At 306, the network inventory tracking control center 116, based on the triggering of the network discovery tool, receives the additional information from the network discovery tool about the new device on the network.

At 308, the network inventory tracking control center 116, based on the additional information received from the network discovery tool about the new device on the network, electronically referencing an inventory of devices on the network or existing information regarding devices expected to be on the network. For example, this may include updating the inventory of devices on the network based on the additional information received. This may also or instead include comparing the additional information received about the new device on the network with the existing information regarding devices expected to be on the network and performing an action based on the comparison.

In various embodiments, the additional information from the network discovery tool about the new device includes one or more of: network interface information, active network ports being used, network connectivity information, further identification information, model number, operational status information and configuration information. In some instances, the additional information from the network discovery tool about the new device may indicates a discrepancy with the existing information regarding devices expected to be on the network. The network inventory tracking control center 116 may then, based on the indicated discrepancy, electronically trigger the separate network discovery tool to electronically interrogate a subnet on which the new device exists to discover other devices that may be on the network that have discrepancies with existing information regarding devices expected to be on the network.

Figure 4:
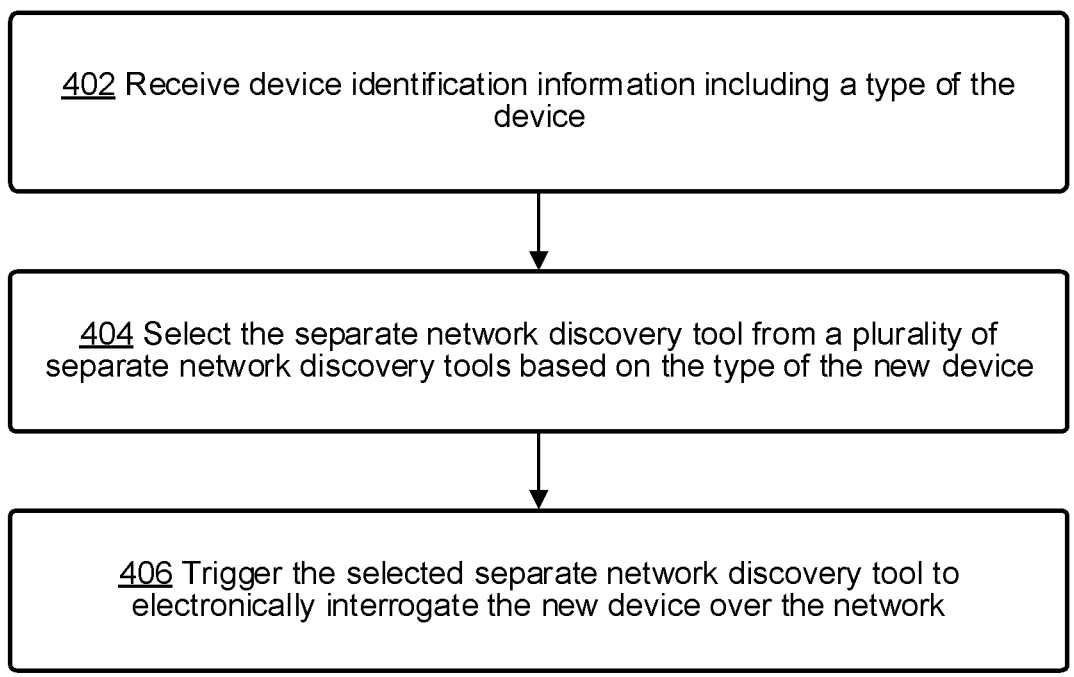
FIG. 4 illustrates a logical flow diagram showing an example embodiment of a process for triggering of device inventory discovery when the type of device is received in accordance with embodiments described herein.

FIG. 4 illustrates a logical flow diagram showing an example embodiment of a process 400 for triggering of device inventory discovery when the type of device is received in accordance with embodiments described herein.

At 402, the network inventory tracking control center 116 receives the additional information from the network discovery tool about the new device on the network, including the type of the new device.

At 404, the network inventory tracking control center 116 electronically selects the separate network discovery tool to interrogate the new device from a plurality of separate network discovery tools based on the type of the new device.

At 406, the network inventory tracking control center 116 triggers the selected separate network discovery tool to electronically interrogate the new device over the network based on the type of the new device.

Figure 5:
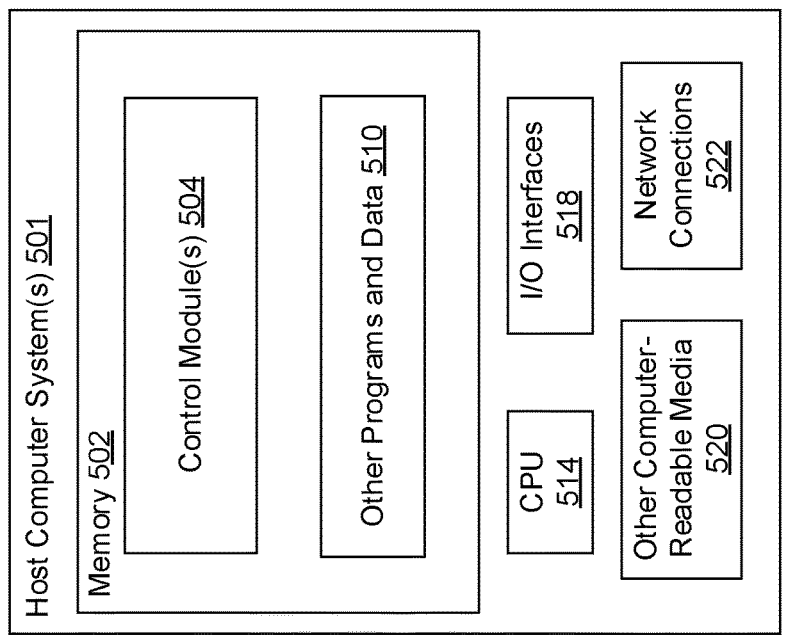
FIG. 5 shows a system diagram that describes an example implementation of computing system(s) for implementing embodiments described herein.

FIG. 5 shows a system diagram that describes an example implementation of computing system(s) 500 for implementing embodiments described herein.

The functionality described herein for triggering of device inventory discovery can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, allowing higher deployment agility and flexibility. However, FIG. 5 illustrates an example of underlying hardware on which such software and functionality may be hosted and/or implemented. For example, computer system(s) 501 may represent example components of underlying computer hardware for some or all of the components shown in FIG. 1.

In particular, shown is example host computer system(s) 501. For example, such computer system(s) 501 may represent one or more of those in various data centers, base stations and cell sites shown and/or described herein that are, or that host or implement the functions of: routers, components, microservices, nodes, node groups, control planes, clusters, virtual machines, NFs, and other aspects described herein for triggering of device inventory discovery. In some embodiments, one or more special-purpose computing systems may be used to implement the functionality described herein. Accordingly, various embodiments described herein may be implemented in software, hardware, firmware, or in some combination thereof. Host computer system(s) 501 may include memory 502, one or more central processing units (CPUs) 514, I/O interfaces 518, other computer-readable media 520, and network connections 522.

Memory 502 may include one or more various types of non-volatile and/or volatile storage technologies. Examples of memory 502 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 502 may be utilized to store information, including computer-readable instructions that are utilized by CPU 514 to perform actions, including those of embodiments described herein.

Memory 502 may have stored thereon control module(s) 1804. The control module(s) 1804 may be configured to implement and/or perform some or all of the functions of the systems, components and modules described herein for triggering of device inventory discovery. Memory 502 may also store other programs and data 510, which may include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 522 are configured to communicate with other computing devices to facilitate the functionality described herein. In various embodiments, the network connections 522 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 518 may include a video interfaces, other data input or output interfaces, or the like. Other computer-readable media 520 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for triggering device inventory discovery in a network comprising:
    electronically listening to one or more event streaming data sources for identification information about new devices on the network;
    in response to receiving identification information about a new device on the network resulting from the listening, triggering a separate network discovery tool to electronically interrogate the new device over the network using the identification information to obtain additional information about the new device;
    based on the triggering of the network discovery tool, receiving the additional information from the network discovery tool about the new device on the network; and
    based on the additional information received from the network discovery tool about the new device on the network, electronically referencing an inventory of devices on the network or existing information regarding devices expected to be on the network;
    wherein:
    the identification information includes a type of the new device; and
    the triggering the separate network discovery tool to electronically interrogate the new device includes selecting the separate network discovery tool from a plurality of separate network discovery tools based on the type of the new device.

2. The method of claim 1 wherein:
    the triggering the separate network discovery tool to electronically interrogate the new device includes:
    electronically providing instructions and applicable event management system (EMS) login credentials to the network discovery tool for the network discovery tool to call an EMS specifically associated with the type of the new device to obtain the additional information about the new device.

3. The method of claim 1 wherein the electronically referencing the inventory of devices on the network based on the additional information received from the network discovery tool about the new device on the network includes:
    updating the inventory of devices on the network based on the additional information received.

4. The method of claim 1, further comprising:
    comparing the additional information received about the new device on the network with the existing information regarding devices expected to be on the network; and
    performing an action based on the comparison.

5. The method of claim 1, wherein the additional information from the network discovery tool about the new device indicates a discrepancy with the existing information regarding devices expected to be on the network, and further comprising:
    based on the indicated discrepancy, electronically triggering the separate network discovery tool to electronically interrogate a subnet on which the new device exists to discover other devices that may be on the network that have discrepancies with existing information regarding devices expected to be on the network.

6. The method of claim 1 wherein the identification information includes at least an Internet Protocol (IP) address and a host name.

7. The method of claim 1 wherein the additional information from the network discovery tool about the new device includes one or more of: network interface information, active network ports being used, network connectivity information, further identification information, model number, operational status information and configuration information.

8. A system for triggering device inventory discovery in a network comprising:
    at least one memory that stores computer executable instructions; and
    at least one processor that executes the computer executable instructions to cause actions to be performed, the actions including:
    electronically listening to one or more event streaming data sources for identification information about new devices on the network;
    in response to receiving identification information about a new device on the network resulting from the listening, triggering a separate network discovery tool to electronically interrogate the new device over the network using the identification information to obtain additional information about the new device;
    based on the triggering of the network discovery tool, receiving the additional information from the network discovery tool about the new device on the network; and
    based on the additional information received from the network discovery tool about the new device on the network, electronically referencing an inventory of devices on the network or existing information regarding devices expected to be on the network;
    wherein:
    the identification information includes a type of the new device; and
    the triggering the separate network discovery tool to electronically interrogate the new device includes selecting the separate network discovery tool from a plurality of separate network discovery tools based on the type of the new device.

9. The system of claim 8 wherein:
    the triggering the separate network discovery tool to electronically interrogate the new device includes:
    electronically providing instructions and applicable event management system (EMS) login credentials to the network discovery tool for the network discovery tool to call an EMS specifically associated with the type of the new device to obtain the additional information about the new device.

10. The system of claim 8 wherein the electronically referencing the inventory of devices on the network based on the additional information received from the network discovery tool about the new device on the network includes:

updating the inventory of devices on the network based on the additional information received.

11. A non-transitory computer-readable storage medium having computer-executable instructions stored thereon that, when executed by at least one processor, cause the at least one processor to cause actions to be performed for triggering device inventory discovery in a network, the actions including:

electronically listening to one or more event streaming data sources for identification information about new devices on the network;

in response to receiving identification information about a new device on the network resulting from the listening, triggering a separate network discovery tool to electronically interrogate the new device over the network using the identification information to obtain additional information about the new device;

based on the triggering of the network discovery tool, receiving the additional information from the network discovery tool about the new device on the network; and based on the additional information received from the network discovery tool about the new device on the network, electronically referencing an inventory of devices on the network or existing information regarding devices expected to be on the network;

wherein:

the identification information includes a type of the new device; and the triggering the separate network discovery tool to electronically interrogate the new device includes selecting the separate network discovery tool from a plurality of separate network discovery tools based on the type of the new device.

12. The non-transitory computer-readable storage medium of claim 11 wherein:

the triggering the separate network discovery tool to electronically interrogate the new device includes:

electronically providing instructions and applicable event management system (EMS) login credentials to the network discovery tool for the network discovery tool to call an EMS specifically associated with the type of the new device to obtain the additional information about the new device.

* * * * *